Sept. 9, 1924.  
C. M. MENDENHALL  
WATER GAUGE GLASS  
Filed Oct. 26, 1923
1,507,926
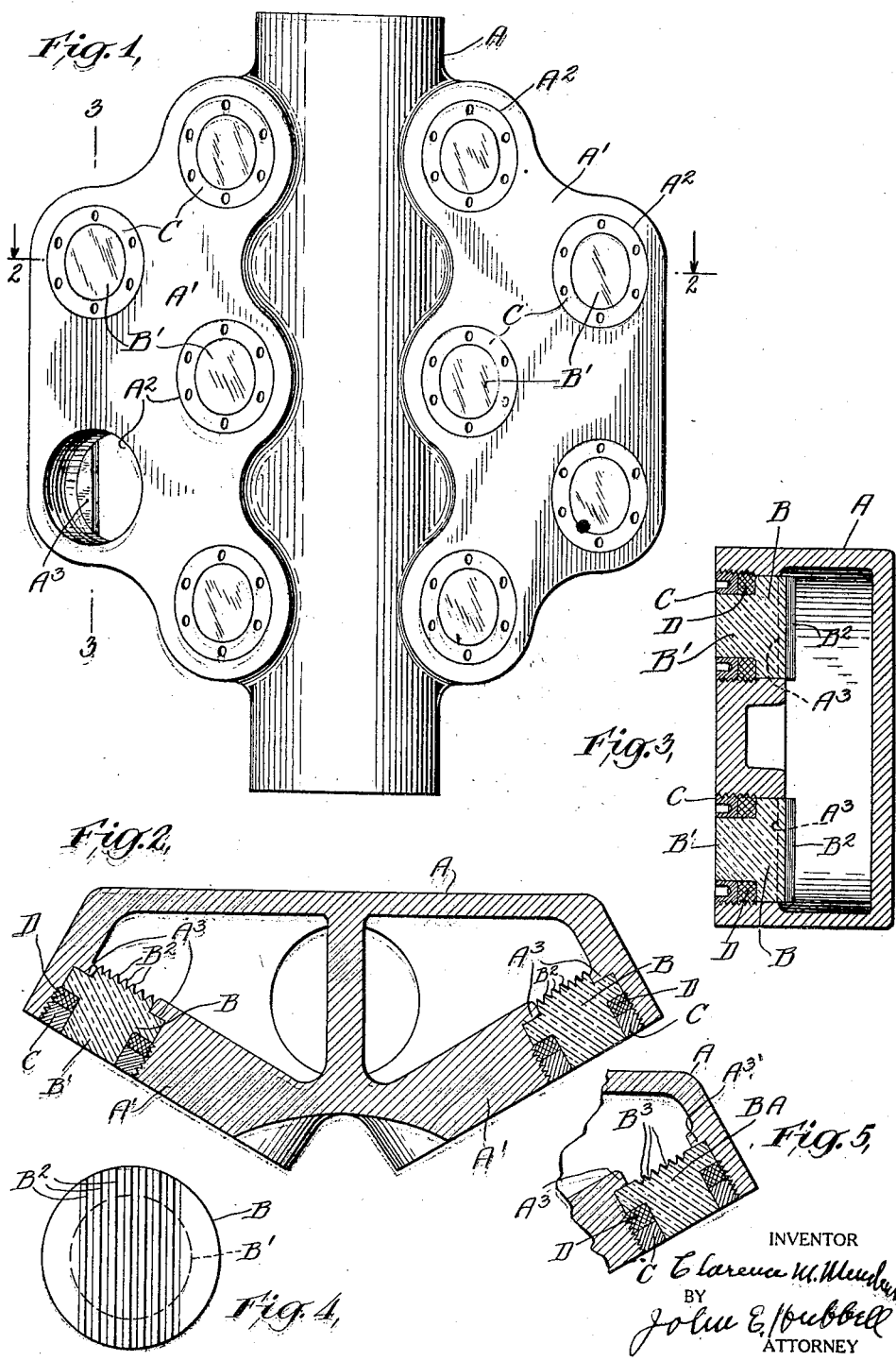

Patented Sept. 9, 1924.

1,507,926

UNITED STATES PATENT OFFICE.

CLARENCE M. MENDENHALL, OF NEW ROCHELLE, NEW YORK.

WATER-GAUGE GLASS.

Application filed October 26, 1923. Serial No. 670,823.

*To all whom it may concern:*

Be it known that I, CLARENCE M. MENDENHALL, a citizen of the United States, and resident of New Rochelle, in the county of Westchester and State of New York, have invented certain new and useful Improvements in Water-Gauge Glasses, of which the following is a specification.

My present invention relates to the type of water gauge glass covered by my prior Patent #1,197,300, which is adapted and intended for showing the height of water level in a boiler and particularly in a locomotive boiler, and in which a gauge casing or body is formed with circular windows in each of which a bull's-eye sight glass formed with vertical prisms on its inner face is mounted. The object of the present invention is to improve the gauge glass of my prior patent in such manner as to reduce the number of bull's-eyes of given diameter required in a single gauge to permit of the observation of the water level as the latter rises and falls between given limits. This I accomplish by modifying the bull's-eye seat portions of the casing body and the shape of the bull's-eyes in such manner that the prisms on the inner face of each bull's-eye may extend and be exposed to the water the full vertical depth of the bull's eye. This increases the vertical fluctuation in water level observable through a single bull's-eye, and avoids the diminution in the range of water level variation observable through a single bull's-eye as a result of dirt accumulations in the gauge body experienced with the form of construction shown in my prior patent.

The various features of novelty which characterize my invention are pointed out with particularity in the claims annexed to and forming a part of this specification. For a better understanding of my invention, however, its advantages and specific objects attained with its use, reference should be had to the accompanying drawings in which I have illustrated and described preferred embodiments of my invention.

Of the drawings;

Fig. 1 is an elevation;

Fig. 2 is a section on the line 2—2 of Fig. 1;

Fig. 3 is a section on the line 3—3 of Fig. 1;

Fig. 4 is an elevation of a bull's-eye employed in Figs. 1, 2, and 3; and

Fig. 5 is a partial section taken similarly to Fig. 2 illustrating a modified form of bull's-eye.

In the drawings, and referring first to the construction shown in Figs. 1 to 4, A represents a water level gauge casing or body which as shown is formed with two vertically extending outer faces A' inclined to one another and each formed with a plurality of window openings A² the body portion of each of which is circular in cross section and has its outer portion internally threaded. Vertical shoulder portions A³ of the gauge casing extend across a segment like portion of each window at opposite sides of its center and form seats against which corresponding segmental portions of the corresponding sight glass bull's-eye B engage. Each bull's-eye comprises a body portion circular in cross section and snugly received in the windows, and an outer portion B' of reduced diameter. Each bull's-eye portion B' is surrounded by an annular nut C screwed into the threaded outer end of the window A² and securing the bull's-eye in place against the shoulders A³. Leakage is prevented by means of a suitable washer or gasket D interposed between the inner end of each nut C and the annular portion of the bull's-eye projecting outwardly from the base of the reduced B' portion thereof. The inner face of each bull's-eye is formed with vertically disposed wedge shaped ribs or prisms B² which extend the full vertical depth of the body portion of the bull's-eye as shown best in Figs. 3 and 4. The bull's-eyes B mounted in each face A' of the casing are arranged in two side by side rows with the bull's-eye in one row staggered with respect to the other and with the adjacent bull's-eyes in each row separated by a distance approximately equal to the maximum diameter of a bull's-eye. The two faces A' of the gauge casing and the bull's-eyes C mounted therein, form in effect two gauges each of which may be read from a point of view at which the other is not visible. Either face A' and its windows A² may be omitted, of course, where conditions do not make the two faces necessary or desirable. In practice suitable provisions are made for connecting the top and bottom of the chamber space A⁴ in the casing A to the boiler with which the gauge is used above and below the water level in the boiler, but these provisions are not illustrated as they form no part of the present invention.

The bull's-eye BA shown in Fig. 5 differs from the bull's-eye B above described in that the prisms at its inner side are formed by making wedge shaped grooves B³ in the inner face of the glass. With this form care must be exercised in securing the bull's-eye in place to keep the prisms approximately vertical, while with the construction first described the rib prisms B² of each bull's-eye project out between the casing shoulders A³ and in effect interlock with the latter with the prisms in the required vertical disposition.

With either form of bull's-eye illustrated, the prisms at the inner sides of each bull's-eye make the water level line clearly discernible when anywhere between the levels of the top and bottom of the bull's-eye, notwithstanding the fact that with the water level near the top or the bottom of the bull's-eye, the line of vision must be at an angle to the axis of the bull's-eye to clear the nut C and marker D. Since with the present invention the inner wall of the casing below each bull's-eye may be flush with, or in front of, the inner face of the bull's-eye, there is no tendency for dirt to accumulate back of the lower portion of each bull's-eye and thus restrict the range of water level variation discernible through the bull's-eye such as exists with the construction of my above mentioned prior patent.

The practical importance of the present invention will be appreciated when account is taken of the relatively high cost of the bull's-eyes and the frequency with which they must be renewed in ordinary practice. Water of the character and at the temperature to which boiler, and particularly locomotive boiler, gauge glasses are exposed eats away and destroys glass at a rate which depends somewhat upon the composition of the glass, but with the most durable glass composition practically available, the life of a bull's-eye in regular service varies in ordinary practice from six weeks to six months. The glass of a suitable composition giving a relatively long life is difficult to work, and the manufacturing cost of the bull's-eyes is much higher than would be expected by anyone not actually familiar with the facts. By proceeding in accordance with the present invention it is possible in practice to observe the boiler water level with a gauge containing five bull's-eyes in each gauge face A′ through a range of variation somewhat greater than can be observed with a gauge of the construction shown in my prior patent, containing seven bull's-eyes of the same maximum diameter. This initial diminution in the number of bull's-eyes required not only results in a saving in their cost, but also reduces the number of joints to be kept steam tight which is a matter of some practical importance.

Having now described my invention, what I claim as new, and desire to secure by Letters Patent, is:

1. A water level gauge consisting of a chambered metallic casing formed with one or more windows each of which is circular in cross section except for shoulder portions of the casing at the inner side of each window and at opposite sides of the axis thereof, and a bull's-eye sight glass mounted in each window with the side portions of its inner face abutting against said shoulders and having the portion of its inner face between said shoulders formed with a series of vertical prisms extending from top to bottom of said face.

2. A water level gauge consisting of a chambered metallic casing having a window opening in one wall which is circular in cross section except for shoulder portions located at the inner side of said opening at the opposite sides of the axis of the opening, the outer faces of said shoulder portions being at the inner side of the inner surface of the portion of said wall beneath said opening, and a bull's-eye sight glass mounted in said opening with the side portions of its inner face abutting against the outer faces of said shoulder portions and formed with vertical prisms in the portion of its inner face between said side portions which extend the full vertical depth of said glass.

3. A bull's-eye sight glass for a water gauge having a substantially circular cross section and an inner face formed with a series of parallel vertical prisms which extend from top to bottom of the glass.

Signed at New York in the county of New York and State of New York this 23rd day of Oct. A. D. 1923.

CLARENCE M. MENDENHALL.